United States Patent
Roy et al.

(10) Patent No.: US 9,279,328 B2
(45) Date of Patent: Mar. 8, 2016

(54) AIRFOIL DEVICES, LEADING EDGE COMPONENTS, AND METHODS OF MAKING

(75) Inventors: Allen J. Roy, Ellington, CT (US); Albert W. Hammeke, Tolland, CT (US)

(73) Assignee: Whitcraft LLC, Eastford, CT (US)

( * ) Notice: Subject to any disclaimer, the term of this patent is extended or adjusted under 35 U.S.C. 154(b) by 612 days.

(21) Appl. No.: 13/280,742

(22) Filed: Oct. 25, 2011

(65) Prior Publication Data

US 2013/0101423 A1 Apr. 25, 2013

(51) Int. Cl.
| | |
|---|---|
| *F01D 5/28* | (2006.01) |
| *F01D 5/14* | (2006.01) |
| *B23P 15/04* | (2006.01) |
| *B22F 3/105* | (2006.01) |
| *B22F 5/04* | (2006.01) |
| *B22F 7/08* | (2006.01) |
| *B23K 26/24* | (2014.01) |

(52) U.S. Cl.
CPC .............. *F01D 5/147* (2013.01); *B22F 3/1055* (2013.01); *B22F 5/04* (2013.01); *B22F 7/08* (2013.01); *B23K 26/24* (2013.01); *B23P 15/04* (2013.01); *F01D 5/282* (2013.01); *F01D 5/288* (2013.01); *B23K 2201/001* (2013.01); *F05D 2220/36* (2013.01); *F05D 2230/30* (2013.01); *Y02T 50/672* (2013.01); *Y02T 50/673* (2013.01)

(58) Field of Classification Search
CPC ........... F01D 5/14; F01D 5/141; F01D 5/147; F01D 5/286
USPC ............... 416/223 R, 223 A, 224, 225, 241 R
See application file for complete search history.

(56) References Cited

U.S. PATENT DOCUMENTS

| | | | | |
|---|---|---|---|---|
| 4,738,594 | A | * | 4/1988 | Sato et al. ...................... 416/224 |
| 5,782,607 | A | * | 7/1998 | Smith et al. .................... 416/224 |
| 6,132,857 | A | * | 10/2000 | Champenois et al. ...... 428/300.7 |
| 6,139,278 | A | * | 10/2000 | Mowbray et al. .......... 416/229 A |
| 7,156,622 | B2 | * | 1/2007 | Schreiber ...................... 416/224 |
| 7,510,778 | B2 | * | 3/2009 | Bernard et al. ............... 428/610 |
| 8,240,046 | B2 | * | 8/2012 | Peretti et al. ............... 29/889.71 |
| 2006/0067830 | A1 | * | 3/2006 | Guo et al. .................. 416/229 R |
| 2006/0090336 | A1 | | 5/2006 | Graham et al. |
| 2011/0033308 | A1 | * | 2/2011 | Huth et al. ................. 416/229 R |
| 2011/0097213 | A1 | | 4/2011 | Peretti et al. |

* cited by examiner

*Primary Examiner* — Craig Kim
*Assistant Examiner* — Kayla McCaffrey
(74) *Attorney, Agent, or Firm* — Sean D. Detweiler, Esq.; Morse, Barnes-Brown & Pendleton, P.C.

(57) ABSTRACT

In a method of making a leading edge component for an airfoil device, a first elongate sheet is provided and has a shape substantially conforming to a surface on one of a suction side or a pressure side of an airfoil. A second elongate sheet is provided and has a shape substantially conforming to a surface on the other of the suction side or the pressure side of the airfoil. The elongate sheets can be welded together at least along respective elongate edges thereof, in such a way as to form a leading edge base structure comprising a weld extending the length of the elongate sheets. Material deposits can be provided onto an outer surface of the leading edge base structure in such a way as to substantially cover the weld, whereby the leading edge component is formed.

30 Claims, 20 Drawing Sheets

AIRFOIL DEVICES, LEADING EDGE COMPONENTS, AND METHODS OF MAKING

FIELD OF THE INVENTION

The present invention relates to airfoil devices suitable for a range of devices, including for example aircraft engine fan blades, and methods of making the same. More particularly, the present invention relates to a leading edge component having adjoining elongate sheets forming a leading edge base structure and providing a plurality of additional layers or material deposits onto an outer convex surface of the leading edge base structure to form a leading edge of an airfoil.

BACKGROUND OF THE INVENTION

In the aircraft industry, turbine engine manufacturers have been moving toward composite airfoils (e.g., fan blades) that utilize light-weight, low-cost composite materials. As a result, newly designed engines are becoming more cost-efficient and energy efficient. However, these light-weight composite materials can possess reduced strength as compared to their heavier, more costly metal counterparts, and thus are more vulnerable to impact from bird strikes and other typical hazards encountered during flight and other operation. Furthermore, aircraft engine airfoils (e.g., fan blades) typically involve highly complex, three-dimensional contoured shapes and surfaces, the forms of which must be precisely maintained in order to function properly and most efficiently. Such shapes and surfaces can include intricate twists, cambers, and other curvatures across the various dimensions of the leading edge of the airfoil (e.g., fan blade). These complex shapes make it difficult, time consuming, and costly to produce metal leading edges with conventional manufacturing processes or techniques. Non-metal leading edges, on the other hand, tend to lack adequate strength or durability, and result in undesirable wear, which reduces the performance of the airfoil. For instance, composite fan blades similar to carbon fibers do not perform well under impact conditions, and can suffer great damage as a result of strikes along the leading edge of the blade, e.g., from foreign objects like bird strikes.

SUMMARY

Accordingly, there is a need for improved methods of manufacturing airfoil devices having composite airfoil bodies and leading edge components to be included thereon having improved strength and wear capabilities over the composite material. The present invention is directed toward further solutions to address this and other needs, in addition to having other desirable characteristics that will be appreciated by one of skill in the art upon reading the present specification.

In accordance with an illustrative embodiment of the present invention, a method of making a leading edge component for an airfoil device having a shape substantially conforming to an airfoil can include providing a first elongate sheet having a shape substantially conforming to a surface on one of a suction side or a pressure side of the airfoil and comprising an elongate edge. A second elongate sheet can be provided that has a shape substantially conforming to a surface on the other of the suction side or the pressure side of the airfoil and comprising an elongate edge. The first elongate sheet and the second elongate sheet can be welded together at least along their respective elongate edges in such a way as to form a leading edge base structure comprising a weld and a convex outer surface. The weld can extend along a length of the convex outer surface. A plurality of material deposits can be provided onto an outer surface of the leading edge base structure in such a way as to substantially cover the weld, whereby the leading edge component is formed.

In accordance with further aspects of the present invention, any width-height cross-section along the length of the leading edge base structure can include a surface portion forming an arc having a substantially uniform radius of curvature. Any width-height ross-section along the length of the leading edge base structure can include a generally rectangular-shaped surface, a generally triangular-shaped surface, a generally flat surface, or a generally step-shaped surface. For any width-height cross-section along the length of the leading edge base structure, the weld can be positioned along a center line of the arc. For any width-height cross-section along the length of the leading edge base structure, the weld can be positioned along a center portion or an off-center portion of the arc.

The shape of the first sheet can substantially conform to a first portion of a leading edge of the airfoil and the shape of the second sheet can substantially conform to a second portion of the leading edge of the airfoil. The first elongate sheet and the second elongate sheet each can conclude with a substantially flat face. The first elongate sheet and the second elongate sheet can be welded together along their respective substantially flat faces.

In accordance with yet further aspects of the present invention, the formed leading edge component can have a near net shape. The formed leading edge component can be partially machined. The leading edge component can be coupled to or otherwise situated on an airfoil body to form the airfoil device. The airfoil device can be an aircraft engine fan blade. The leading edge component can be formed of a substantially metal based material. The airfoil body can be formed of a substantially non-metal based material. The leading edge component can be formed of a substantially metal based material and the airfoil body can be formed of a substantially non-metal based material. The leading edge component can be formed of one or more first materials and the airfoil body can be formed one or more second materials, and the one or more first materials can be partially or entirely different from the one or more second materials. The plurality of material deposits can be metallic.

In accordance with still further embodiments of the present invention, the plurality of material deposits can be provided onto the outer surface of the leading edge base structure using an additive manufacturing technique. The additive manufacturing technique can include laser cladding. The step of welding together the first elongate sheet and the second elongate sheet can include laser welding. A plurality of leading edge components can be formed, and the plurality of leading edge components can be included in an aircraft engine.

In accordance with another illustrative embodiment of the present invention, a device can include a plurality of airfoil devices each having a shape substantially conforming to an airfoil. Each of the plurality of airfoil devices can include an airfoil body and a leading edge component situated on the airfoil body. The leading edge component of each of the plurality of airfoil devices can include a leading edge base structure, which can include a first elongate sheet, a second elongate sheet, and a weld coupling the first elongate sheet to the second elongate sheet. The weld can extend across substantially all of a length of the leading edge base structure. The leading edge component can include a plurality of material deposits disposed on an outer surface of the leading edge base structure and extending along substantially all of the length thereof. The first elongate sheet can have a shape substantially conforming to a surface on one of a suction side or a pressure side of the airfoil and the second elongate sheet can have a shape substantially conforming to a surface on the other of the suction side or the pressure side of the airfoil.

In accordance with further embodiments of the present invention, the plurality of material deposits covers substantially all of the weld. Each of the plurality of airfoil devices can be a fan blade. The device can be an aircraft engine or a turbine engine. The first and second elongate sheets can be formed of a metal or metal based material. Each. leading edge component can be formed of a substantially metal based material. Each airfoil body can be formed of a substantially non-metal based material. Each leading edge component can be formed of a substantially metal based material and each airfoil body can be formed of a substantially non-metal based material. Each leading edge component can be formed of one or more first materials and each airfoil body can be formed one or more second materials, and the one or more first materials can be partially or entirely different from the one or more second materials. The plurality of material deposits can include metallic material.

In accordance with yet another embodiment of the present invention, a leading edge component for being situated on an airfoil body can be made according to a method. The method can include providing a first elongate metallic sheet having a shape substantially conforming to a surface on one of a suction side or a pressure side of the airfoil and comprising an elongate edge. The method further can include providing a second elongate metallic sheet having a shape substantially conforming to a surface on the other of the suction side or the pressure side of the airfoil and comprising an elongate edge. The method further can include welding together the first elongate metallic sheet and the second elongate metallic sheet at least along their respective elongate edges in such a way as to form a leading edge base structure comprising a weld and a convex outer surface. The weld can extend along a length of the convex outer surface. The method further can include providing a plurality of metallic layers onto an outer surface of the leading edge base structure in such a way as to substantially cover the weld, whereby the metallic leading edge component is formed.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
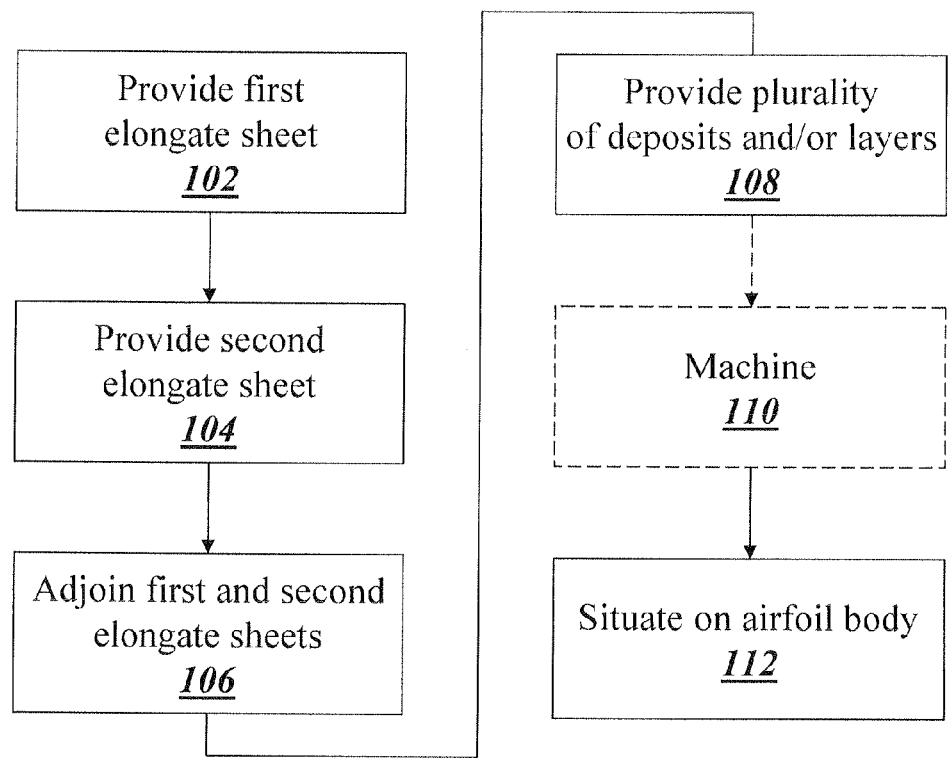
FIG. 1 is a flow chart depicting an example method for manufacturing an airfoil device, according to embodiments of the present invention.

An illustrative embodiment of the present invention relates to an airfoil device. The airfoil device can include a leading edge component made up of at least a leading edge base structure and a plurality of material deposits (e.g., metallic layers) formed thereon. The leading edge base structure can include two elongate sheets coupled together by a weld. Each of the elongate sheets can have a shape substantially conforming to a surface on one of a suction side or a pressure side of an airfoil. The leading edge base structure can be shaped to form an elongate (e.g., arc-shaped) bend having a substantially uniform radius of curvature.

FIGS. 1 through 13, wherein like parts are designated by like reference numerals throughout, illustrate example methods for making metallic leading edge components and airfoil devices comprising the same, according to embodiments of the present invention.

Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

Figure 5A:
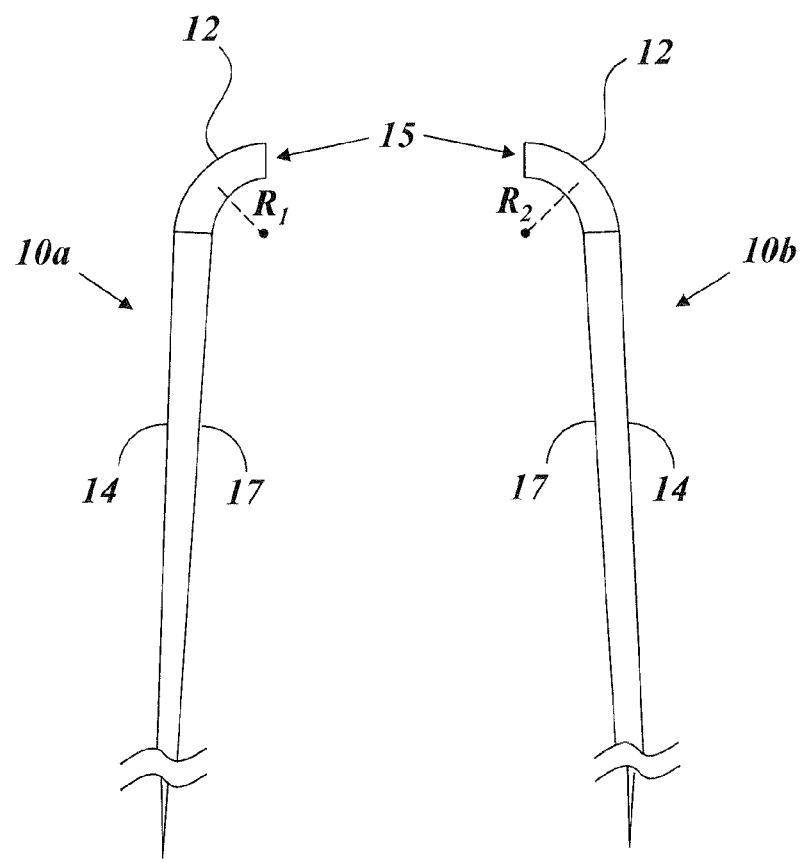
FIG. 5A is a cross-sectional view of two example elongate sheets having curved edges, according to aspects of the present invention.
Figure 5B:
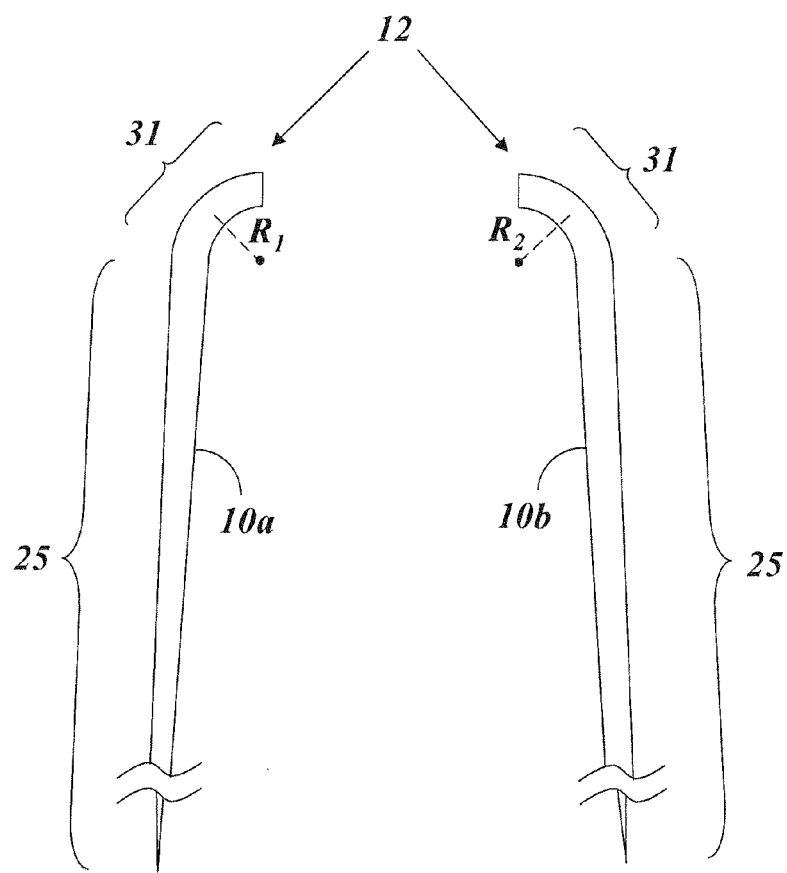
FIG. 5B is a cross-sectional view of two alternative example elongate sheets having curved edges, according to aspects of the present invention.

FIG. 1 depicts an example method of making an airfoil device according to embodiments of the present invention. A first elongate sheet and a second elongate sheet can be provided (steps 102 and 104, respectively). In illustrative embodiments, each of the elongate sheets is constructed of the same material(s), which can include one or more metal(s) and/or metal-based material. Each of the elongate sheets can have a curved edge (e.g., a perimeter edge that curves away from a remainder of the elongate sheet). For instance, FIG. 5A depicts a width-height cross section of two example elongate sheets 10a, 10b having curved edges 12. As described in greater detail later herein, in some embodiments, each of the curved edges 12 of the elongate sheets 10a, 10b initially is a separate member that is adjoined (e.g., by laser, TIG, or another form of welding) with a remainder sheet component to form the respective elongate sheet 10a or 10b. Accordingly, in such embodiments, each curved edge 12 can be manufactured separately from its corresponding remainder sheet component that forms the elongate sheets 10a or 10b. In other embodiments, however, the elongate sheets 10a, 10b each are manufactured as a single piece, as depicted in FIG. 5B. For instance, in such embodiments, each of the elongate sheets 10a, 10b can be absent any welds or other coupling regions.

Figure 2:
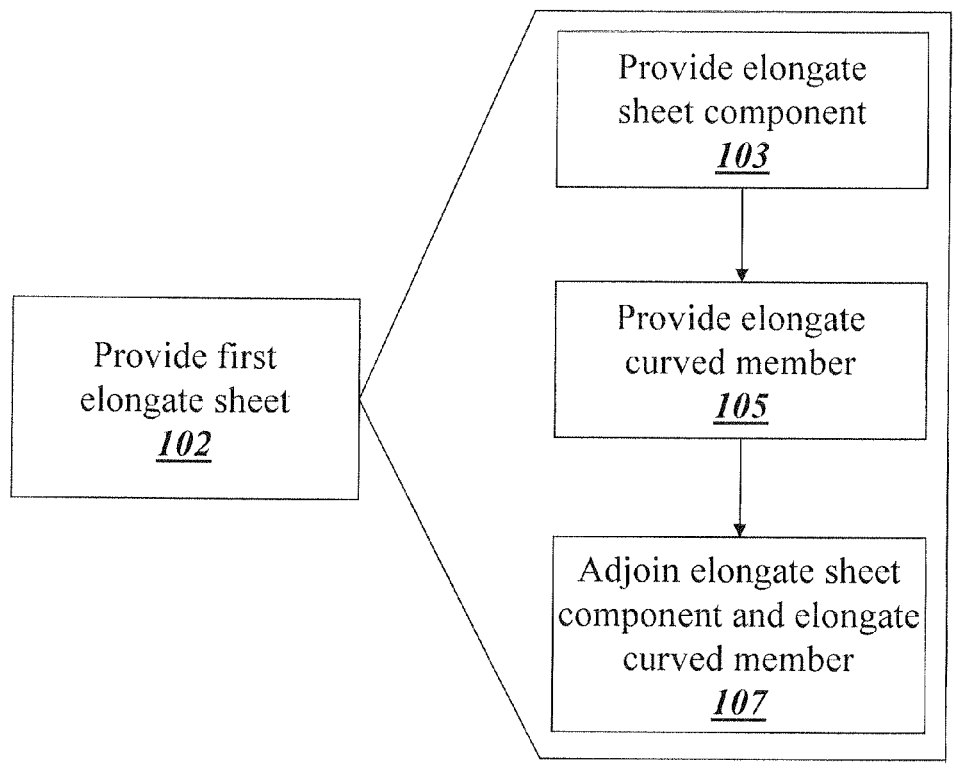
FIG. 2 is a flow chart depicting an example method for providing an elongate sheet, according to aspects of the present invention.

FIG. 2 depicts an example method for making the elongate sheets 10a, 10b from two or more separate (e.g., unconnected, at least initially) component parts. For instance, in some embodiments, the step 102 can include providing an elongate sheet component (step 103) and providing an elongate curved member (step 105) that, in this case, is separate from the elongate sheet component. The elongate sheet component and the elongate curved member can be adjoined (step 107), e.g., along one or more substantially flat surfaces thereof. In some embodiments, the step 107 of adjoining specifically includes adjoining a surface along a proximal end of the first elongate curved member with a matching, complimentary, or corresponding surface along an edge of the elongate sheet component.

Figure 6:
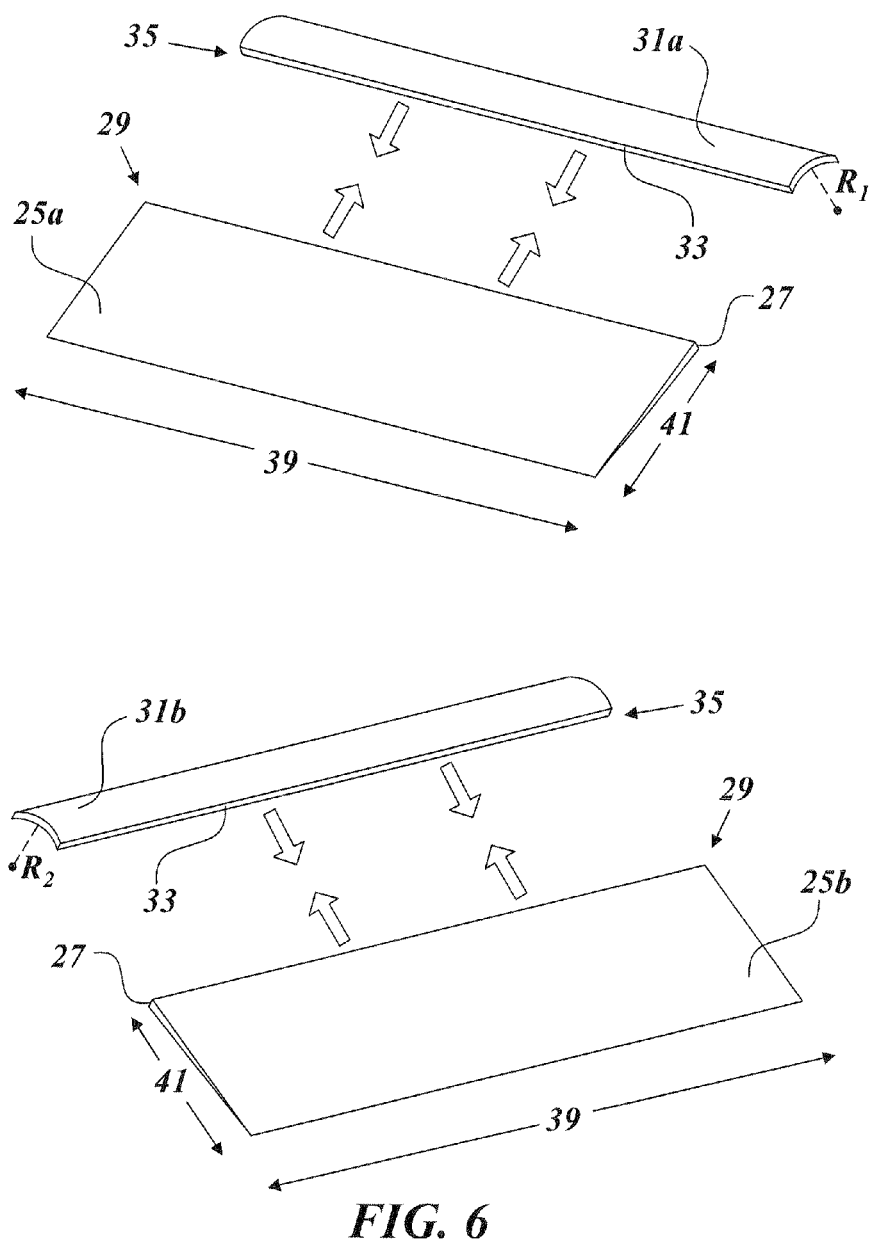
FIG. 6 is an illustrative diagram of an elongate sheet component and an elongate curved member for forming an elongate sheet, according to aspects of the present invention.

For example, FIG. 6 illustrate an example embodiment of an elongate sheet components 25a, 25b each having a substantially flat surface 27 located at an edge 29 thereof. The elongate sheet components 25a, 25b each can be adjoined with an elongate curved member 31a, 31b having a substantially flat surface 33 located at a proximal end 35 thereof. In particular, the elongate sheet components 25a, 25b and the elongate curved members 31a, 31b can be adjoined along their corresponding substantially flat surfaces 27, 33. For instance, the arrows illustrated in FIG. 6 indicate a direction in which each of the elongate sheet components 25a, 25b and the elongate curved members 31a, 31b can be adjoined along their substantially flat surfaces 33, 27. In illustrative embodiments, the two elongate curved members 31a, 31b have substantially identical lengths 39.

Although FIG. 6 depicts each of the elongate sheet components 25a, 25b as being substantially flat across its entire length 39 and its entire depth 41, one of skill in the art will readily appreciate that in actuality, each of the elongate sheet components 25a, 25b can include a wide variety of surface contours, so as to have a shape conforming to a surface of an airfoil. For instance, the elongate sheet component 25a can have a shape conforming to a surface on one of a pressure side or a suction side of an airfoil, and the elongate sheet component 25b can have a shape conforming to a surface on the other of the pressure side or the suction side of the airfoil. Furthermore, for each of the elongate sheet components 25a, 25b, the surface of the airfoil can form a portion of a leading edge on the pressure side or suction side of the airfoil. As such, the elongate sheet component 25a, 25b can include at least one (and in many instances, a plurality of) cambers, twists, curvatures, and/or other surface irregularities along its length 39 and/or its depth 41, thereby forming the shape of the surface of the airfoil.

In illustrative embodiments, each of the elongate curved members 31a, 31b forms a portion of an elongate (e.g., arc-shaped) bend. An "elongate bend," as herein defined, refers to structure extending for a particular length and comprising a plurality of successive width-height cross-sections (i.e., each showing a width and a height) each forming at least an arc. For instance, for any given cross-section, the arc formed by the inner (i.e., concave) face or surface can occupy an angular displacement of about 5°, about 10°, about 15°, about 20°, about 25°, about 30°, about 35°, about 40°, about 45°, about 50°, about 55°, about 60°, about 65°, about 70°, about 75°, about 80°, about 85°, about 90°, about 95°, about 100°, about 105°, about 110°, about 115°, about 120°, about 125°, about 130°, about 135°, about 140°, about 145°, about 150°, about 155°, about 160°, about 165°, about 170°, about 175°, about 180°, another value, or any intermediary value falling therebetween. Furthermore, the arc formed by each width-height cross section of each of the elongate curved members 31a, 31b can have a substantially uniform thickness and/or a substantially uniform radius of curvature (i.e., as measured from the inner face or surface of the arc, as described above). The elongate (e.g., arc-shaped) bend generally may include one or more turns along its length, or alternatively can extend in a substantially uniform direction.

In illustrative embodiments, each of the elongate curved members 31a, 31b forms a portion of an elongate (e.g., arc-shaped) bend, and each of the elongate curved members 31a, 31b has a radius ($R_1$ or $R_2$, respectively, as measured from a center point to the concave surface or face of the elongate curved members 31a, 31b) of curvature that is substantially uniform along the entire length 39 thereof. Furthermore, in illustrative embodiments, each of the elongate curved members 31a, 31b forms a portion of an elongate (e.g., arc-shaped) bend having an angular displacement that is substantially uniform along the entire length 39 thereof.

FIG. 6 illustrates an example embodiment wherein the elongate sheet components 25a, 25b and the elongate curved members 31a, 31b as initially separate and subsequently adjoined to form the elongate sheets 10a, 10b of FIG. 5A. Accordingly, in the example embodiment of FIG. 5A, the curved edges 12 of the elongate sheets 10a, 10b each are formed by the elongate curved member 31a or 31b of FIG. 6. However, it should be understood that these multiple elements alternatively can be made (e.g., formed integral with one another) as a single component comprising multiple portions forming the various different components. For instance, as depicted in the example alternative embodiment of FIG. 5B, each of the elongate sheets 10a, 10b is a continuous piece, which includes a portion at the curved edge 12 forming the elongate curved member 31a or 31b and a portion forming the elongate sheet component 25a or 25b.

In general, each of the elongate sheets 10*a*, 10*b* can have a shape substantially conforming to a surface on an airfoil. For instance, the elongate sheet 10*a* can have a shape conforming to a surface on one of a pressure side or a suction side of an airfoil, and the elongate sheet 10*b* can have a shape conforming to a surface on the other of the pressure side or the suction side of the airfoil. Furthermore, for each of the elongate sheets 10*a*, 10*b*, the surface of the airfoil being conformed thereto can form a portion of a leading edge of the airfoil (e.g., a portion of the leading edge on the pressure side or a portion of a leading edge on suction side). As such, each of the elongate sheets 10*a*, 10*b* can include at least one (and in many instances, a plurality of) cambers, twists, curvatures, and/or other surface irregularities along its length and/or its width, thereby forming the respective shape of the surface of the airfoil.

Furthermore, each of the elongate sheets 10*a*, 10*b* include one or more inner surfaces 17 having shapes substantially conforming to a shape and/or contour of an airfoil body on which the elongate sheets 10*a*, 10*b* will eventually be situated. For instance, the inner surfaces 17 can have three-dimensional surface contours that mimic (e.g., are perfect inversions of) or otherwise conform to three-dimensional surface contours on outer surfaces forming distal sides of an airfoil body. Thus, in this manner, the elongate sheets 10*a*, 10*b* can be configured to fit like matching puzzle pieces against a distal portion of an airfoil body.

In general, any airfoil shape can be suitable for implementation with embodiments of the present invention. As described above, illustrative embodiments provide the elongate sheets 10*a*, 10*b* with shapes that, in combination, conform to single-side surfaces of a leading edge of an airfoil on both a suction side and a pressure side of the airfoil. For instance, as depicted in the example embodiment of FIG. 5A, an outer surface 14 on each of the elongate sheets 10*a*, 10*b* can have a three-dimensional contoured shape that substantially conforms to the particular airfoil surface. Thus, the outer surfaces 14 can be configured to adequately serve as a portion of a leading edge on an airfoil device.

Figure 3:
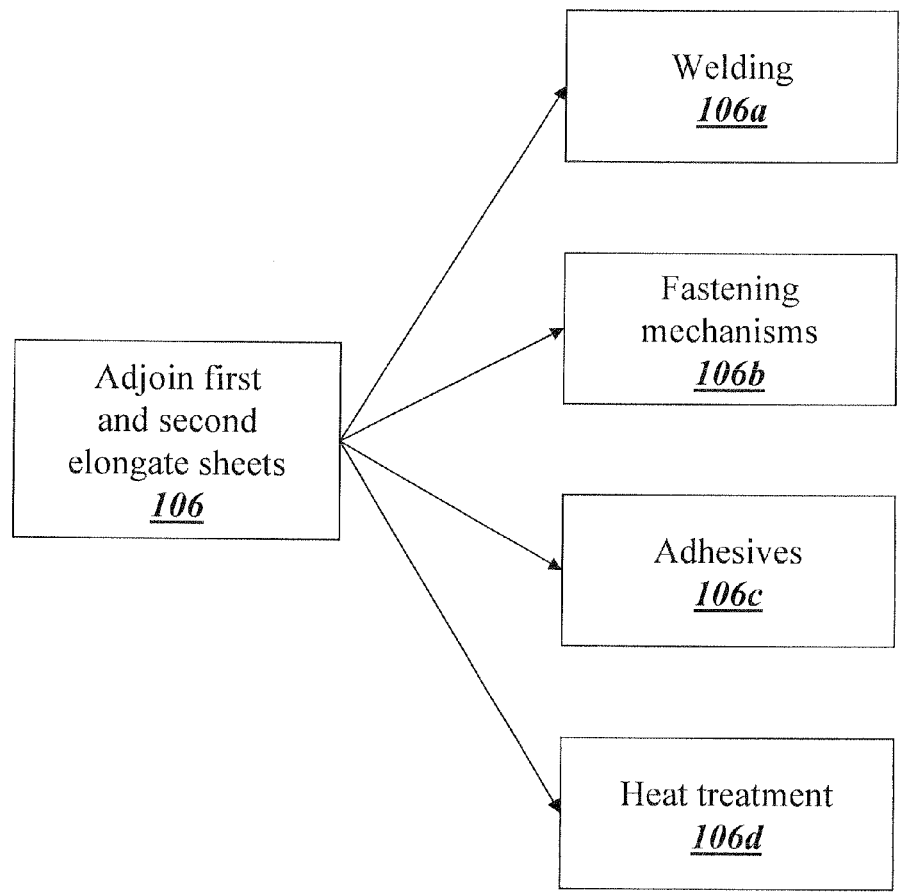
FIG. 3 is a schematic representation of several example processes for adjoining two elongate sheets to each other, according to aspects of the present invention.

Continuing with FIG. 1, the first elongate sheet 10*a* and the second elongate sheet 10*b* can be adjoined to form a leading edge base structure (step 106). For example, in illustrative embodiments, the elongate sheets 10*a*, 10*b* each is adjoined with the other at least along an elongate edge thereof (e.g., one of the edges formed at the curved edges 12). A number of conventional methods for adjoining the elongate sheets 10*a*, 10*b* can be utilized, as would be appreciated by one of skill in the art upon reading the present specification. FIG. 3 depicts four example methods by which the elongate sheets 10*a*, 10*b* can be adjoined. For instance, the step 106 of adjoining the first elongate sheet 10*a* and the second elongate sheet 10*b* can include welding (step 106*a*), using fastening mechanisms (step 106*b*), using adhesives (106*c*), using heat treatment (step 106*d*), using other thermo-joining processes, or using other mechanisms for adjoining, although certain methods may be substantially more preferred based on desired characteristics of the final product, such as weight, aerodynamic profile, and durability. The examples provided herein and depicted in FIG. 3 are illustrative and are not intended as limiting.

"Welding," as used to herein, refers to standard welding procedures used to unite any two or more pieces, portions, components, parts, units, or other elements. As such, welding is not limited exclusively to metals, and can be used to adjoin metallic parts, plastic parts, etc., and other articles and material(s). "Welding" includes its normal definition as would be appreciated by one of skill in the art. For instance, welding includes any process of uniting that involves application of heat, e.g., to allow the materials of the two or more pieces to flow together. The application of heat generally can be applied using any suitable form of thermodynamic heat transfer. For example, heat can be generated and transferred through kinetic energy (e.g., by hammering), through a heat source (e.g., a laser, electrodes, etc.), through compression, or through any other suitable mechanism for applying heat. However, heat need not be applied in order to be considered "welding," e.g., as with cold welding. As some illustrative examples, welding can include laser welding, gas welding, tungsten inert gas welding, gas metal arc welding, energy beam welding, electron beam welding, forge welding, resistance welding, spot welding, seam welding, solid-state welding, ultrasonic welding, explosion welding, friction welding, cold welding, and any other form of welding known to one of skill in the art.

In illustrative embodiments of the present invention, the elongate sheets 10*a*, 10*b* are welded together (step 10*a*). For example, each curved edge 12 can conclude with a face 15. The face 15 can be substantially flat and can extend substantially along the entire length of the elongate sheet 10*a* or 10*b*. Accordingly, the elongate sheets 10*a*, 10*b* can be welded together along an entirety of their flat faces 15. As a result of the step 106 of adjoining, a leading edge base structure can be formed thereby, which includes the elongate sheets 10*a*, 10*b* adjoined by a weld (or other coupling region).

Figure 7A:
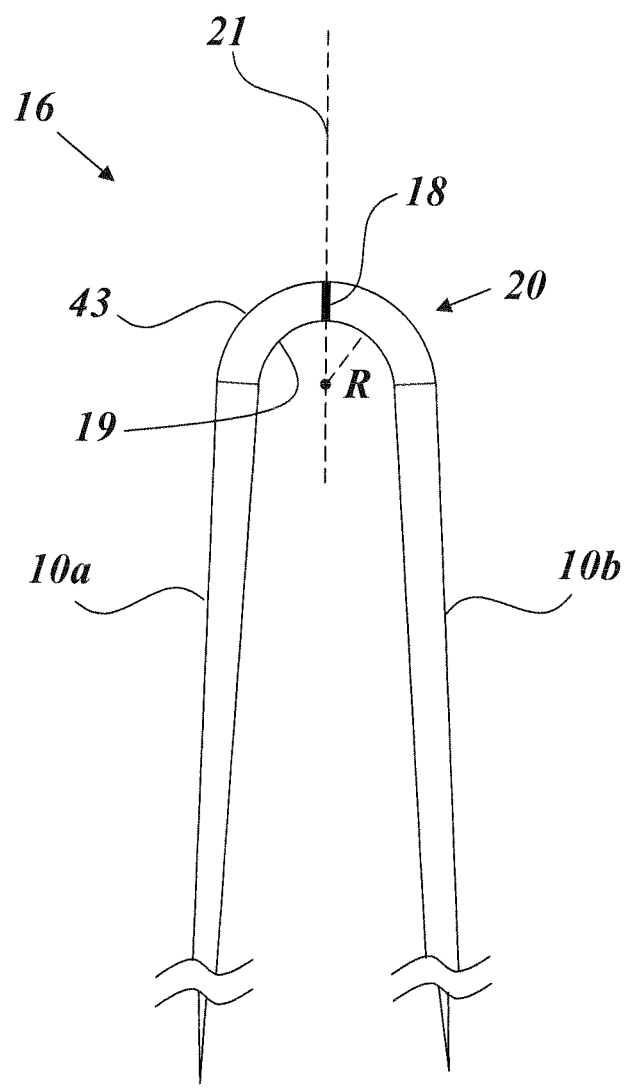
FIG. 7A is an illustrative diagram of an example elongate leading edge base structure having a curved portion and formed by adjoining the two example elongate sheets of FIG. 5A along their curved edges, according to aspects of the present invention.
Figure 7B:
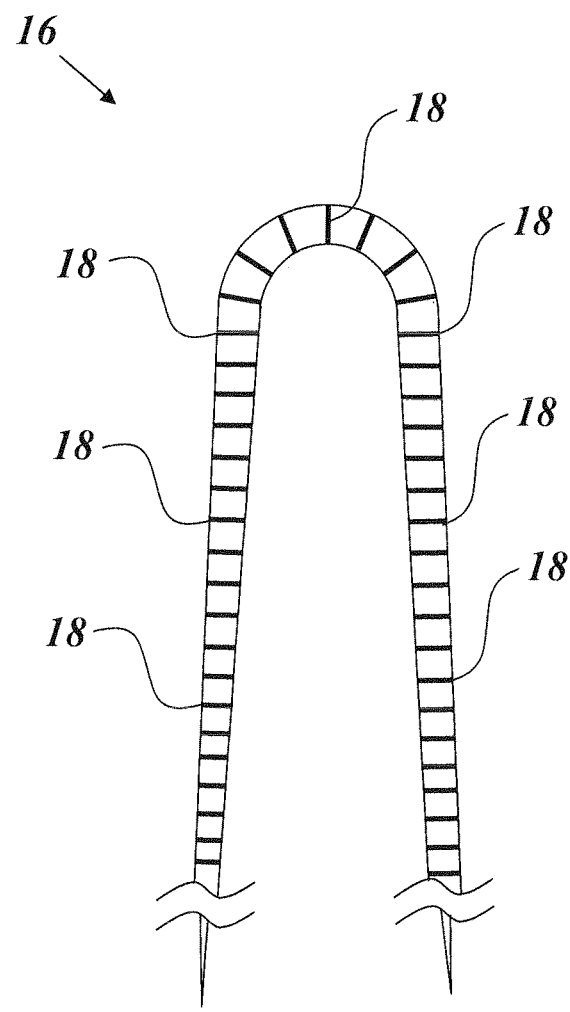
FIG. 7B is an illustrative diagram of a plurality of example positions for welds or other coupling regions for adjoining portions forming the example leading edge base structure of FIG. 7A, according to aspects of the present invention.

One example of such a leading edge base structure 16 is depicted in FIG. 7A from a cross-sectional view, as formed by the example step 106*a* of welding. In addition to the elongate sheets 10*a*, 10*b*, the leading edge base structure 16 includes a curved edge portion 20 situated on a leading-edge-side of the leading edge base structure 16 and formed by the two curved edges 12 of the elongate sheets 10*a*, 10*b* welded together. The leading edge base structure 16 includes a weld 18 (or other coupling region), e.g., along which the elongate sheets 10*a*, 10*b* are adjoined. The weld 18 extends along substantially all of a length of the leading edge base structure 16. The leading edge base structure 16 can include a concave an inner surface 19 and a convex outer surface 43.

As with the elongate sheets 10*a*, 10*b*, the inner surface 19 of the curved edge portion 20 can form an elongate (e.g., arc-shaped) bend, each width-length cross-section of which can form an arc having a substantially uniform radius of curvature (e.g., as measured from a center of the thickness of the elongate bend). Additionally, the radius of curvature of the arc formed by the inner surface 19 can be substantially the same at any position along the length of the leading edge base structure 16. Accordingly, the elongate (e.g., arc-shaped) bend formed by the curved edge portion 20 can have a radius of curvature that is substantially uniform both (a) at each angular position along the bend, and (b) at each lengthwise position along an entire length of the curved edge portion 20. Thus, in a similar manner, the inner surface 19 and the outer surface 43 each can have a radius of curvature that is substantially uniform along the length of the leading edge base structure 16.

FIG. 7A depicts one example width-height cross-section, in which the inner surface 19 of the curved edge portion 20 forms an arc having a radius R of curvature (e.g., which can equal both the radius $R_1$ of curvature of edge 12 of the elongate sheet 10*a* and the radius $R_2$ of curvature of edge 12 of the elongate sheet 10*b*). Thus, in illustrative embodiments, each width-height cross-section that is not depicted similarly forms an arc having the same radius R of curvature. There is no limit on the value that the radius R assumes. For example, the radius R can be about 0.01" (inches), about 0.02", about 0.03", about 0.04", about 0.05", about 0.06", about 0.07", about 0.08", about 0.09", about 0.10", about 0.11", about 0.12", about 0.13", about 0.14", about 0.15", about 0.16", about 0.17", about 0.18", about 0.19", about 0.20", about 0.21", about 0.22", about 0.23", about 0.24", about 0.25", about 0.26", about 0.27", about 0.28", about 0.29", about 0.30", about 0.35", about 0.40", about 0.45", about 0.50", about 0.55", about 0.60", about 0.65", about 0.70", about 0.75", about 0.80", about 0.85", about 0.90", about 0.95", about 1.0", about 2.0", about 3.0", about 4.0", about 5.0", about 10.0", about 20.0", about 25.0", any other value, or any intermediary value falling therebetween, as would be appreciated by one of skill in the art. In one illustrative embodiment implemented for an aircraft engine fan blade, the radius R can equal about 0.101". Furthermore, one of skill in the art can appreciate that the radius R can assume a higher or lower value, e.g., by making the inner surface 19 to form an arc that occupies a smaller or greater amount of angular displacement, respectively. These ranges are provided for purposes of illustration and do not limit embodiments of the present invention.

In a similar manner, one of skill in the art will readily appreciate that the outer surface 43 of the curved edge portion 20 similarly can form an elongate (e.g., arc-shaped) bend. Furthermore, at any given width-height cross-section, the arc formed by the outer surface 43 can occupy an angular displacement that is equal to or different from the angular displacement of the arc formed by the inner surface 19 (e.g., so as to provide the curved edge portion 20 with a substantially uniform or a non-uniform thickness).

As further depicted in FIG. 7A, the weld 18 can be positioned on a center line of the arc formed by the curved edge portion 20. For example, the center line along which the weld 18 is positioned can be a center line 21 that divides the arc into two equal-area halves, or alternatively/additionally that divides the arc into two equal angular displacement halves (e.g., in embodiments where the arc has a non-uniform thickness).

Furthermore, the weld 18 can be positioned in another location, e.g., that is not along the center line 21. Furthermore, more than one weld 18 (or other coupling region) can be included. In general, any such one or more weld(s) 18 can be positioned on a center portion of the arc or on an off-center portion of the arc. For instance, FIG. 7C depicts a plurality of possible positions for such weld(s) 18 (or other coupling regions) along which various portions forming the elongate sheets 10a, 10b can be coupled together. As depicted in FIG. 7C, the welds 18 (or other coupling regions) can be located at the curved edge portion 20, on flanks of the leading edge base structure 16, or both. In addition, the leading edge base structure 16 can be formed from any suitable number of welded (or otherwise coupled) portions, as would be appreciated by one of skill in the art.

Figure 4:
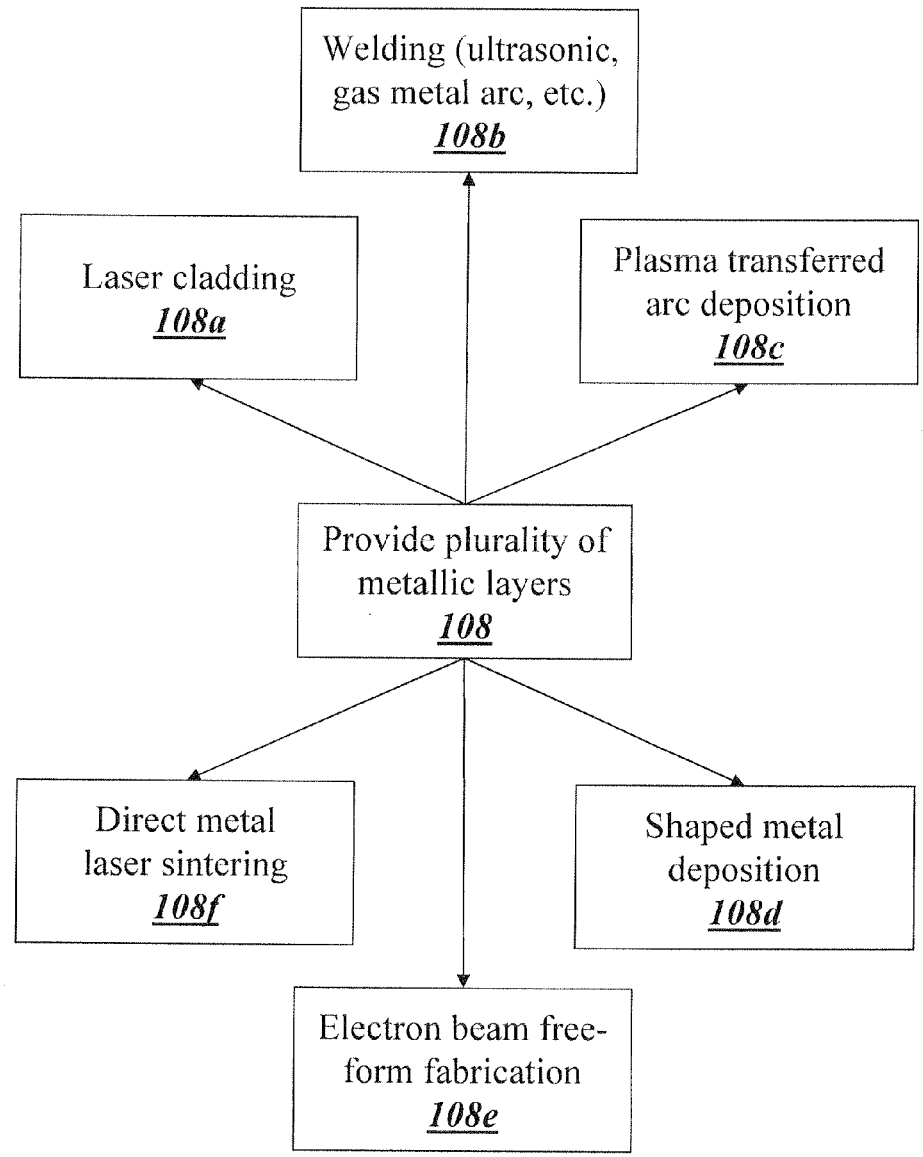
FIG. 4 is a schematic representation of several example additive manufacturing techniques for providing a plurality of material deposits (e.g., metallic layers), according to aspects of the present invention.

Referring again to FIG. 1, a plurality of material deposits (e.g., metallic layers) can be provided to the leading edge base structure 16 (step 108), in such a way as to extend over and cover substantially any portion of the weld 18 exposed at the outer surface 43. For example, the material deposits can be deposited as strips, layers, powder, wires, and other suitable forms of material. In illustrative embodiments, each and every weld 18 that is included and that is exposed at the outer surface 43 is substantially entirely covered by the material deposits, as described herein. The material deposits (e.g., metallic layers) can be provided using any conventional or suitable technique. For instance, FIG. 4 depicts five illustrative examples of additive manufacturing techniques for providing the material deposits (e.g., metallic layers) in the step 108. In particular, the step 108 can be performed using laser cladding (step 108a), welding (e.g., ultrasonic welding, gas metal arc welding, etc.) (step 108b), plasma transferred arc deposition (step 108c), shaped metal deposition (step 108d), electron beam free-form fabrication (step 108e), direct metal laser sintering (step 108f), or other additive manufacturing techniques, e.g., additive manufacturing techniques performed at high temperatures (e.g., metal laser sintering, etc.). Again, one of skill in the art will appreciate that certain methods may be preferable over others when factoring in desired characteristics of the final product, including weight, aerodynamic profile, and durability.

Figure 8:
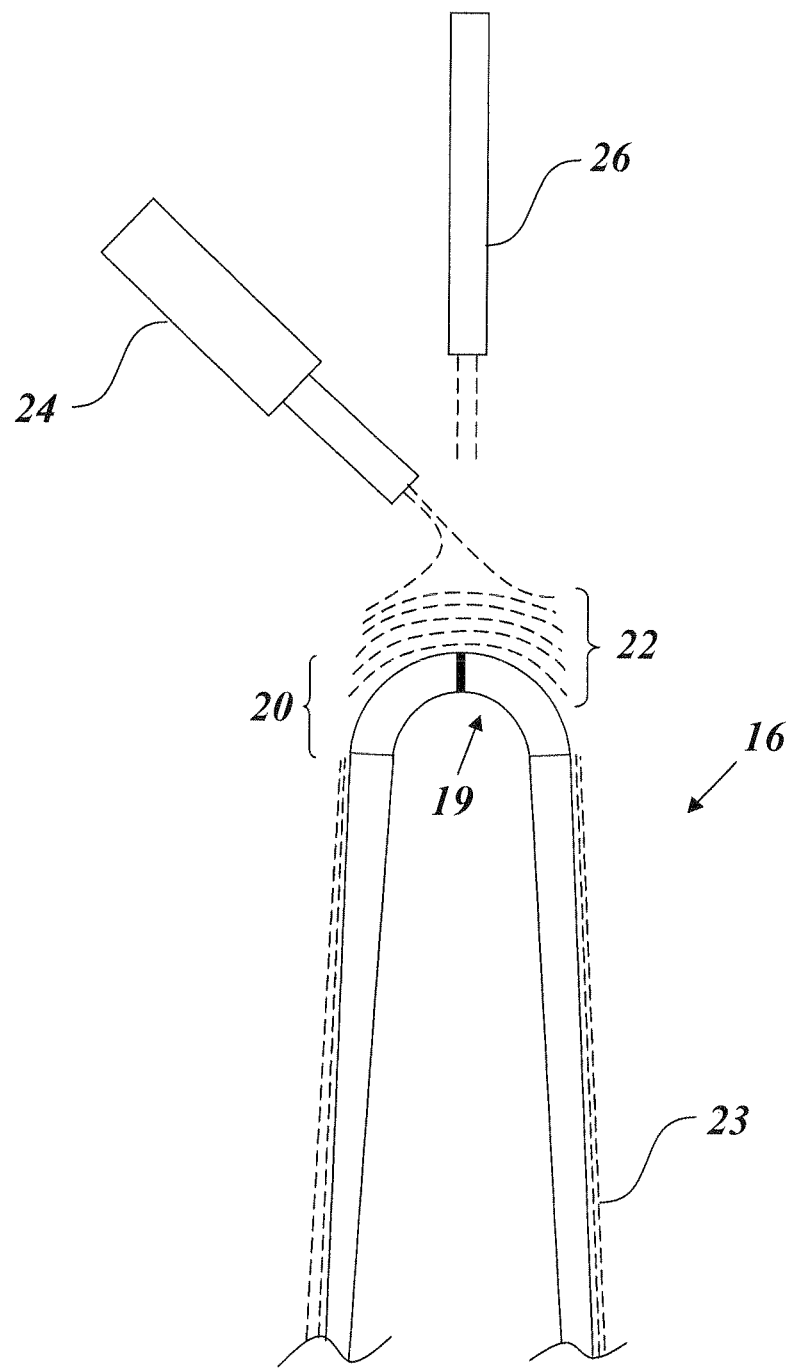
FIG. 8 is an illustrative diagram of the example leading edge base structure of FIG. 7 receiving a plurality of material deposits being provided to a curved outer edge thereof, according to aspects of the present invention.

In accordance with one illustrative embodiment, the step 108 of providing a plurality of material deposits (e.g., metallic layers) is performed using the step 108a of laser cladding. For instance, FIG. 8 depicts an example embodiment in which a plurality of material deposits 22 (e.g., metallic layers) are applied to the leading edge base structure 16 using a dispenser 24 and a laser device 26 (e.g., a laser system in combination with a focusing optical system coupled to a vertical motion stage). In particular, in the example embodiment of FIG. 8, the plurality of material deposits 22 (e.g., metallic layers) are layered onto the leading edge base structure 16 at the curved edge portion 20 and on the convex outer surface 43, in an additive and iterative manner. Deposited material 23 optionally can also be applied to one or more outer sides of the leading edge base structure 16, e.g., using an additive manufacturing technique such as any of those depicted in FIG. 4. In such embodiments, the deposited material 23 can be provided in such a way as to increase the thickness without substantially changing the outer surface shape of the elongate sheets 10a, 10b. For instance, the deposited material 23 can be provided in such a way as to substantially conform to the shape of the elongate sheets 10a, 10b.

Continuing with FIG. 1, the plurality of material deposits (e.g., metallic layers) provided in the step 108 optionally can be machined to achieve a particular desired shape (step 110). However, in illustrative embodiments, the step 110 of machining the plurality of material deposits (e.g., metallic layers) is not performed or is only minimally performed. As will be appreciated by one of skill in the art, high degrees of accuracy in shape are achievable, at least when utilizing additive manufacturing techniques such as those depicted in and described with reference to FIG. 4. Accordingly, in step 108, the plurality of layers can be provided in such a way as to both (a) substantially cover and extend across any portions of the weld 18 that are exposed at the outer surface 43, and (b) create a near net shape.

Furthermore, the near net shape (or alternatively, the partially machined shape) can substantially conform to a portion of the leading edge of the airfoil shape to which the elongate sheets 10a, 10b conform. For instance, in illustrative embodiments, the plurality of material deposits (e.g., metallic layers) are layered onto the leading edge base structure 16 in such a way that the plurality of material deposits (e.g., metallic layers) form an outer contoured surface that substantially replicates a distal-most (i.e., leading most) portion of a leading edge of an aircraft engine fan blade. While illustrative embodiments described herein are implemented for airfoils suitable for aircraft engine fan blades, one of skill in the art will appreciate that the particular airfoil shape to which the near net shape (or partially machined shape) conforms can be selected based on the intended applications and usages of the resulting airfoil device. For instance, a plurality of example airfoil shapes are depicted and described later herein with reference to FIG. 13.

Figure 9A:
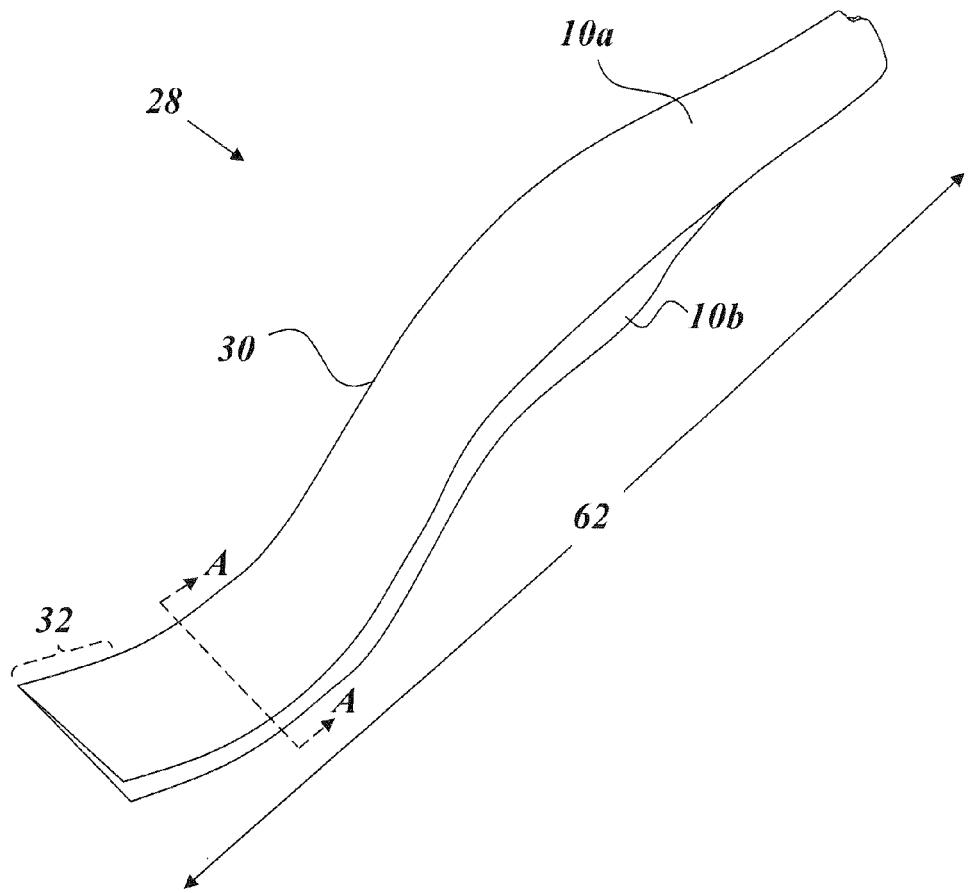
FIG. 9A is a perspective view of an example leading edge component according to embodiments of the present invention.
Figure 9B:
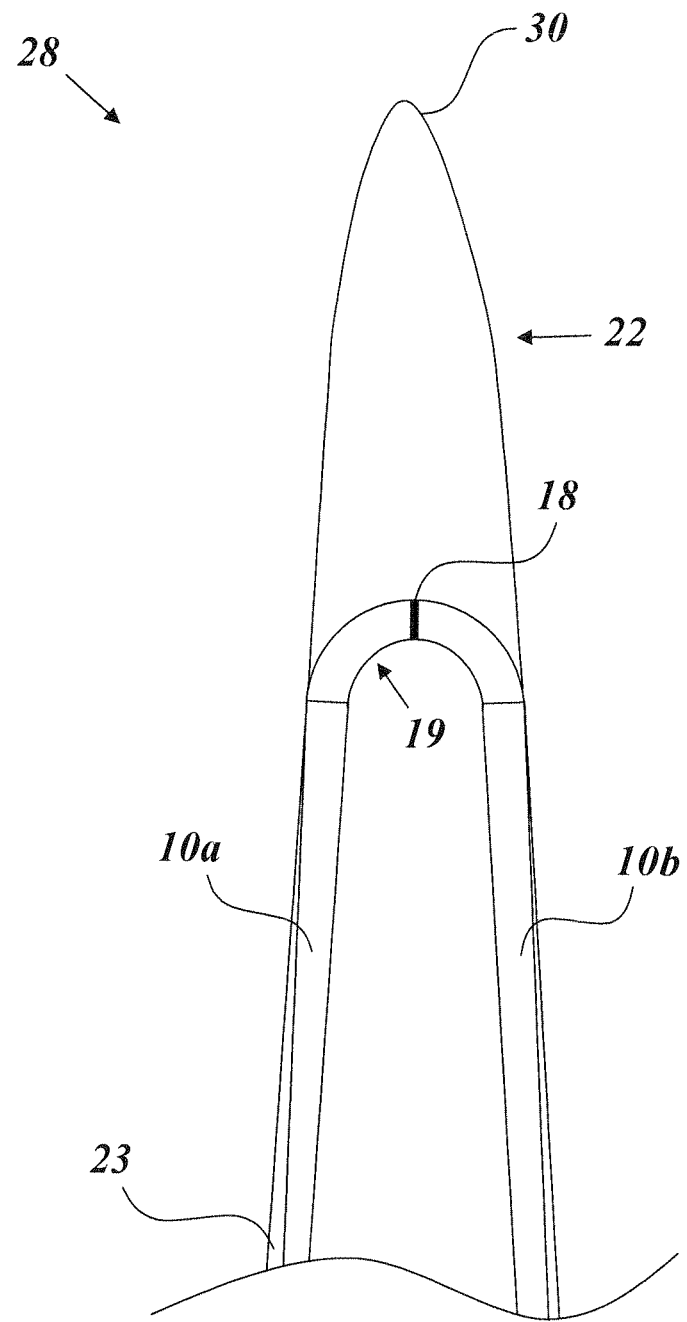
FIG. 9B is a cross-sectional view of a portion of the example leading edge component of FIG. 9A along line A-A, according to aspects of the present invention.
Figure 9C:
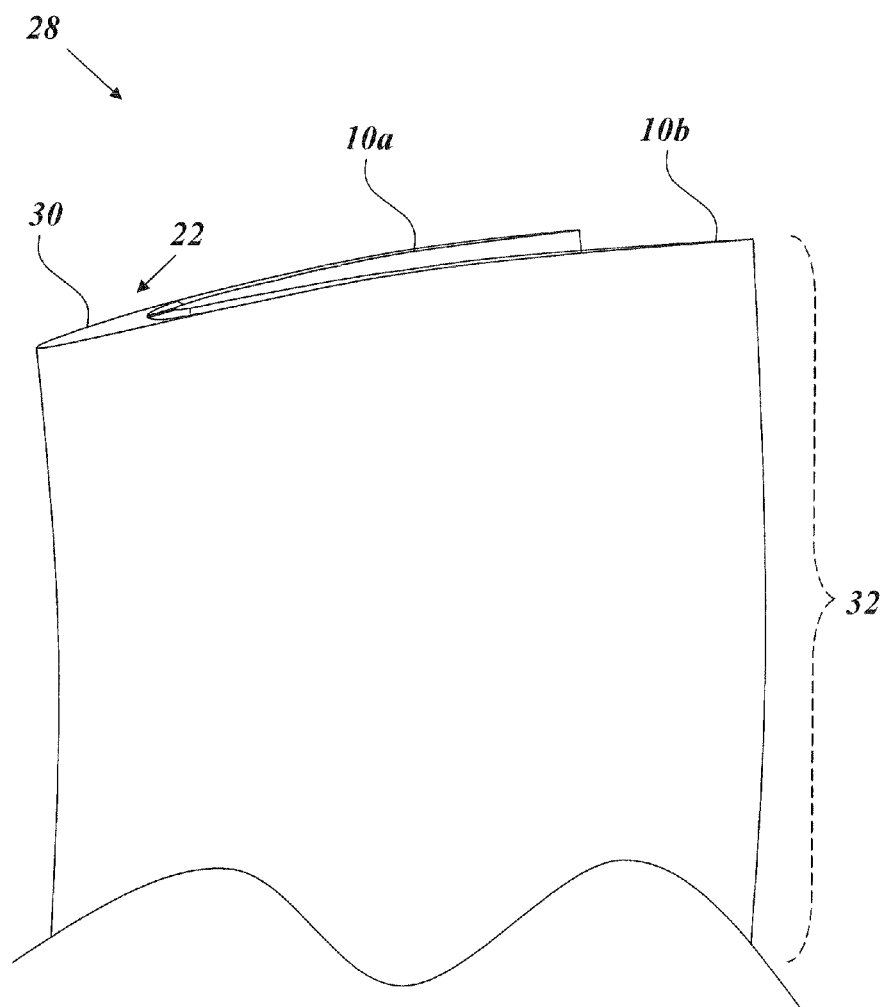
FIG. 9C is a close-up perspective view of a portion of the example leading edge component of FIG. 9A, according to aspects of the present invention.

Accordingly, using the method of FIG. 1, a leading edge component (e.g., constructed of one or more metals or metal-based materials) can be made that is suitable for serving as a leading edge portion of an airfoil device (e.g., blade, vane, wing, rudder, control surface, etc.). Furthermore, as depicted in step 112 of FIG. 1, leading edge components made thereby can be situated on (e.g., fixedly coupled to) an airfoil body, thereby forming an airfoil device. More specifically, it should be noted that the present invention makes possible the creation of an airfoil device wherein the airfoil body is made of a first material and a leading edge component thereof is formed of a second material or materials. For example, an airfoil can be made of a composite material as is presently known and understood by those of skill in the art to provide a lightweight and strong blade for the fan of an aircraft engine, while the leading edge component is constructed of harder and/or more durable material, such as titanium metal. In such a scenario, the present invention can be relied upon to provide a leading edge component 28 formed of a different material that provides greater strength and durability properties, such as a metallic or metal-based material or materials, FIG. 9A depicts a perspective view of an illustrative example of such a leading edge component 28, e.g., which can be made according to the methods of FIGS. 1 through 4. FIG. 9B further illustrates a portion of a width-height cross section of the leading edge component 28, along line A-A. FIG. 9C depicts an enlarged and alternate perspective view of a first end 32 of the leading edge component 28.

As depicted, the leading edge component 28 generally can include the first elongate sheet 10a and the second elongate sheet 10b adjoined by a weld 18 (or other coupling region). The leading edge component 28 further can include a plurality of material deposits 22 (e.g., metallic layers) disposed on and substantially covering a distal end of the weld 18. The leading edge component 28 optionally can include deposited material 23 along the sides of the first and second elongate sheets 10a, 10b. The plurality of material deposits 22 (e.g., metallic layers) can form a three-dimensional contoured outer surface 30 that substantially conforms to (e.g., is substantially identical to) a leading portion of a particular desired airfoil shape, in the example, an aircraft engine fan blade.

The leading edge component 28 further can include a concave inner surface 19, as well as a plurality of width-height cross-sections extending along its length 62. Each of the plurality of width-height cross-sections can be shaped as an arc having a substantially uniform radius of curvature. In illustrative embodiments, the radii of curvature of the formed arcs are substantially the same along the entire length 62 of the leading edge component 28. Furthermore, the material deposits 22 (e.g., metallic layers) can be generated using, e.g., a laser cladding process, providing metallic or metal-based material deposits (e.g., metallic layers).

Figure 10A:
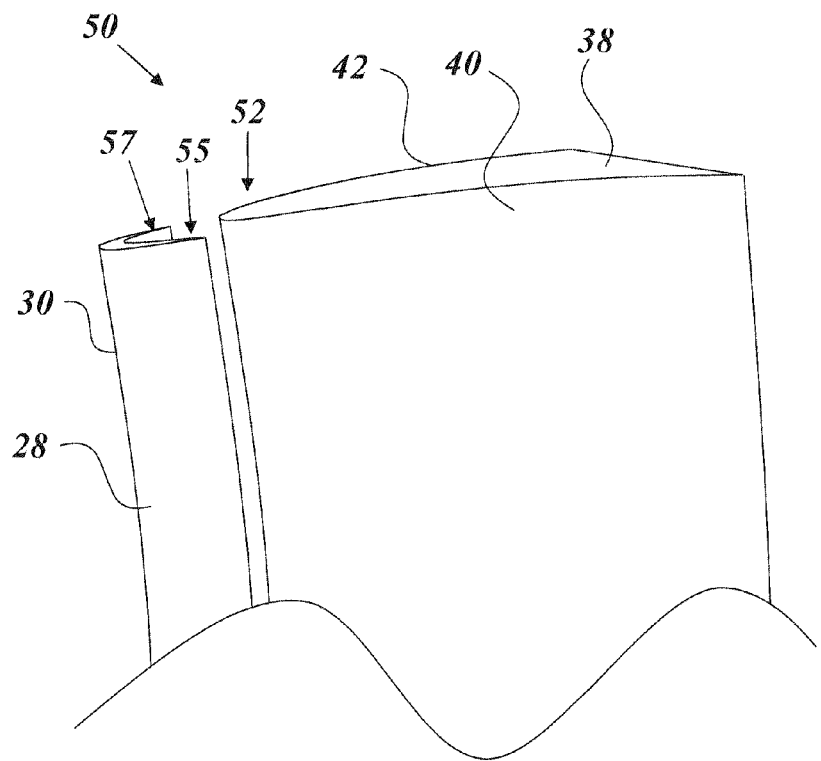
FIG. 10A is an exploded perspective view of a portion of an example airfoil device that includes the example leading edge component of FIG. 9A, according to embodiments of the present invention.
Figure 10B:
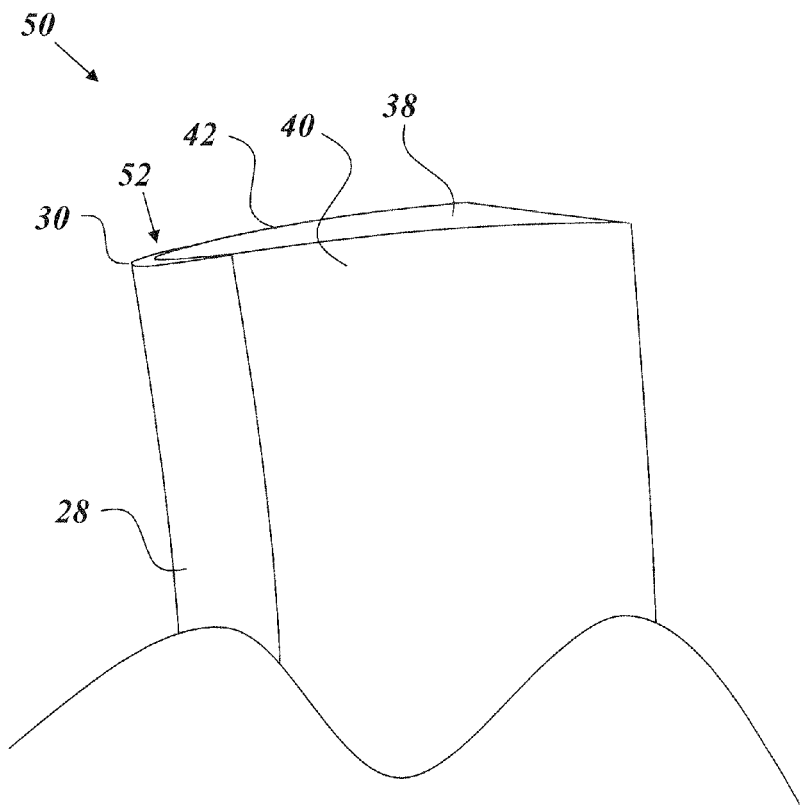
FIG. 10B is a perspective view of the portion of the airfoil device of FIG. 10A, in which the leading edge component is situated on the airfoil body, according to embodiments of the present invention.
Figure 10C:
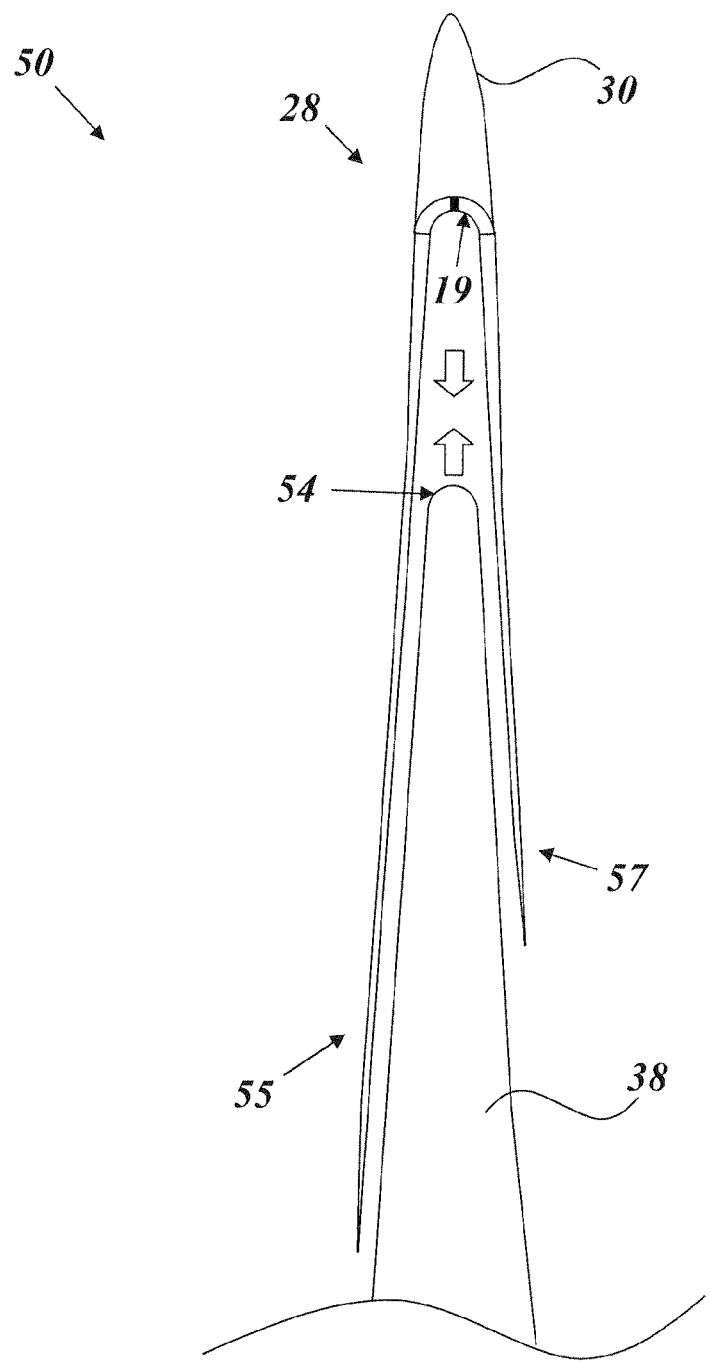
FIG. 10C is an exploded cross-sectional view of a portion of the example airfoil device of FIGS. 10A and 10B, according to embodiments of the present invention.

FIGS. 10A through 10C depict an example embodiment of an airfoil device 50 that includes an airfoil body 38, as well as the leading edge component 28 situated on an edge 52 of the airfoil body 38. Specifically, FIG. 10A depicts an exploded perspective view of a portion of the airfoil device 50, in which the airfoil body 38 and the leading edge component 28 are shown as separated, for purposes of clarity and illustration, FIG. 10B depicts a perspective view of the portion of the airfoil device 50 of FIG. 10A, in which the leading edge component 28 is shown as situated on the airfoil body 38. In particular, the leading edge component 28 can be securely situated on the edge 52 of the airfoil body 38 using adhesives (e.g., along substantially all of the inner surface 19), welding processes, a friction fit, or any other suitable mechanisms for secure coupling. In illustrative embodiments, the leading edge component 28 can be bonded with airfoil body 38 using one or more industrial adhesives and an autoclave for creating pressure that presses the leading edge component 28 against the airfoil body 38. The particular industrial adhesives can be selected to have particular desired characteristics and properties, e.g., being capable of withstanding extreme operational conditions and loads, as would be understood by one of skill in the art. The airfoil body 38 includes a suction side 40 and a pressure side 42, e.g., which work in combination to generate lift and maximize efficiency during operation of the airfoil device 50. As will be appreciated by one of skill in the art reading the present specification, upper ends of the airfoil body 38 (as oriented in FIGS. 10A and 10B) can be flush with upper ends of the leading edge component 28, e.g., so as to reduce drag on the airfoil device 50 during operation thereof, In general, flank portions 55, 57 of the leading edge component 28 covering the airfoil body 38 can extend across at least a minimum portion of the airfoil body 38's depth. For example, flank portions 55, 57 can extend across and cover at least about 5% of the depth of the airfoil body 38, at least about 10% of the depth of the airfoil body 38, at least about 15% of the depth of the airfoil body 38, at least about 20% of the depth of the airfoil body 38, at least about 25% of the depth of the airfoil body 38, at least about 30% of the depth of the airfoil body 38, at least about 35% of the depth of the airfoil body 38, at least about 40% of the depth of the airfoil body 38, at least about 45% of the depth of the airfoil body 38, at least about 50% of the depth of the airfoil body 38, at least about 55% of the depth of the airfoil body 38, at least about 60% of the depth of the airfoil body 38, at least about 65% of the depth of the airfoil body 38, at least about 70% of the depth of the airfoil body 38, at least about 75% of the depth of the airfoil body 38, at least about 80% of the depth of the airfoil body 38, at least about 85% of the depth of the airfoil body 38, at least about 90% of the depth of the airfoil body 38, at least about 95% of the depth of the airfoil body 38, about 100% of the depth of the airfoil body 38, another percentage of the depth of the airfoil body 38, or any intermediate percentage falling therebetween. In illustrative embodiments, flank portions 55, 57 extend across at least about 15% or 20% of the airfoil body 38.

The inner surface 19 of the leading edge component 28 and the edge 52 of the airfoil body 38 can have complimentary shapes, such that the leading edge component 28 fits flush against the edge 52 of the airfoil body 38 like a matching puzzle piece. Thus, in illustrative embodiments, the inner surface 19 of the leading edge component 28 is in contact with the airfoil body 38 at substantially every point along the length 62 of the leading edge component 28. For example, FIG. 10C further depicts the complimentary manner in which the metallic leading edge component 28 and the airfoil body 38 can be adjoined.

In particular, FIG. 10C illustrates an exploded view of a cross section of the airfoil device 50 of FIGS. 10A and 10B. The airfoil body 38 can include an outer surface 54 forming a convex arc shape that compliments the concave arc shape of the inner surface 19 of the leading edge component 28. More specifically, the convex arc shape of the outer surface 54 can have a substantially uniform radius of curvature that is substantially the same as the substantially uniform radius of curvature of the concave arc shape of the inner surface 19. In addition, the convex arc shape of the outer surface 54 can occupy an angular displacement that is substantially the same as the amount of angular displacement occupied by the concave arc shape of the inner surface 19. The arrows in FIG. 10C indicate a direction in which the leading edge component 28 and the airfoil body 38 are to be adjoined.

Figure 11A:
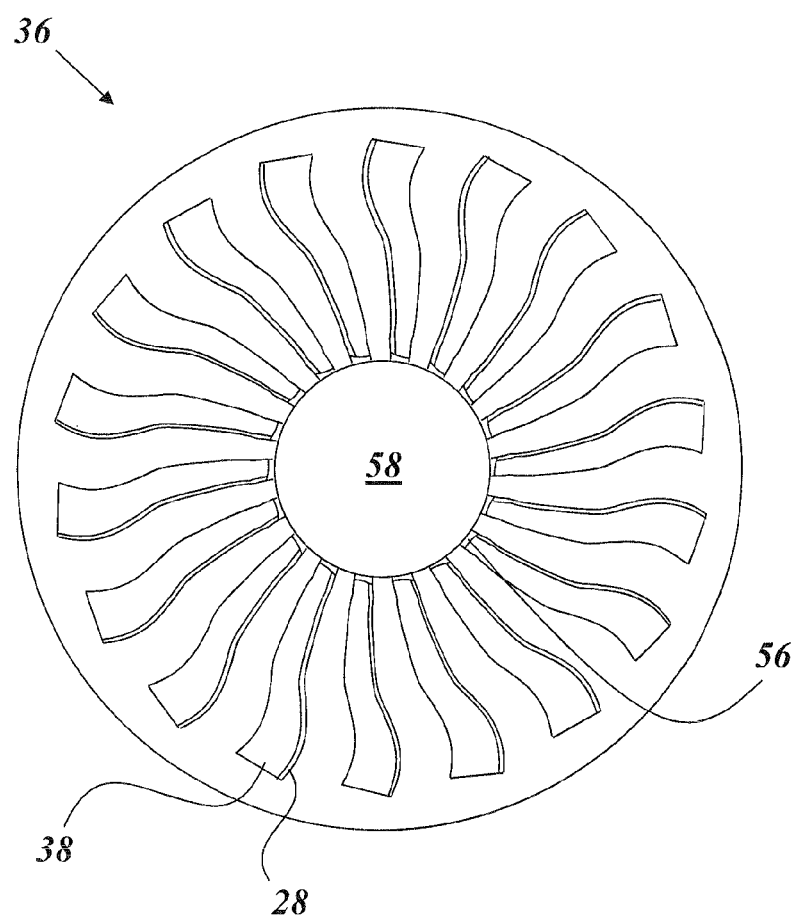
FIG. 11A is a front view of an example aircraft engine that includes the example airfoil devices of FIG. 10A, according to aspects of the present invention.
Figure 11B:
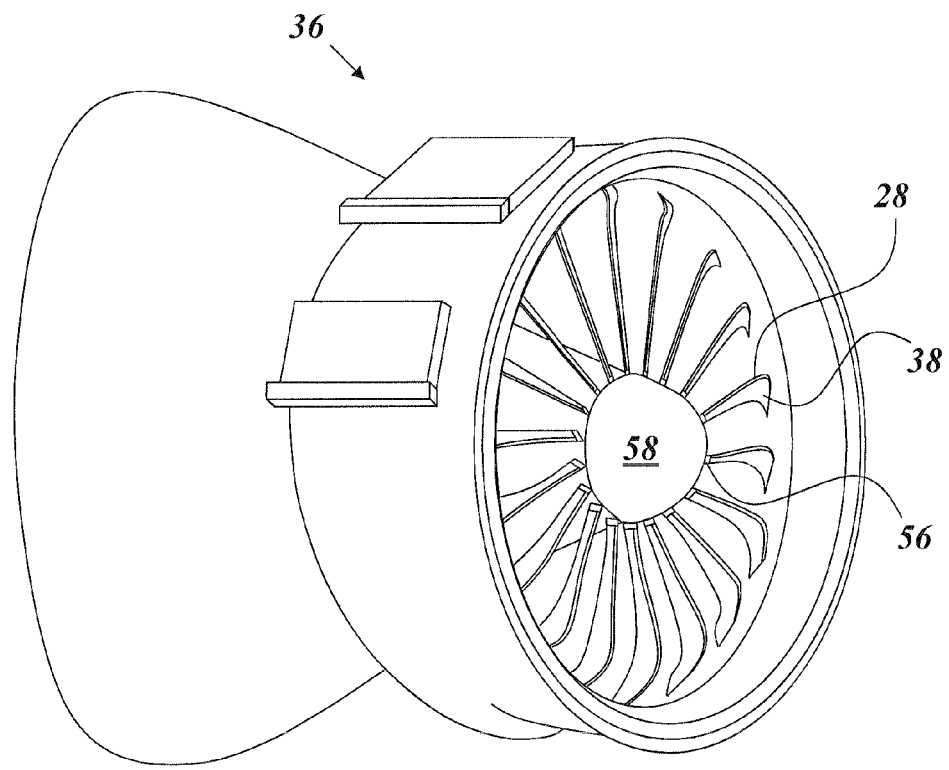
FIG. 11B is a perspective view of the example aircraft engine of FIG. 11A, according to aspects of the present invention.

The airfoil device 50 of FIGS. 10A through 10C can be included in any number of devices or apparatuses. For instance, FIGS. 11A and 11B depict one embodiment of an example aircraft engine 36 that includes a plurality of the airfoil devices 50 as fan blades. Each airfoil device 50 can be coupled to a root 56, which can be coupled, e.g., to a rotor portion 58 of a rotor assembly included in the aircraft engine 36. Additional standard components of aircraft engines can be included in the example aircraft engine 36 (e.g., compression zones, combustions chambers, turbines, etc.), as will be readily appreciated by one of skill in the art.

Figure 12:
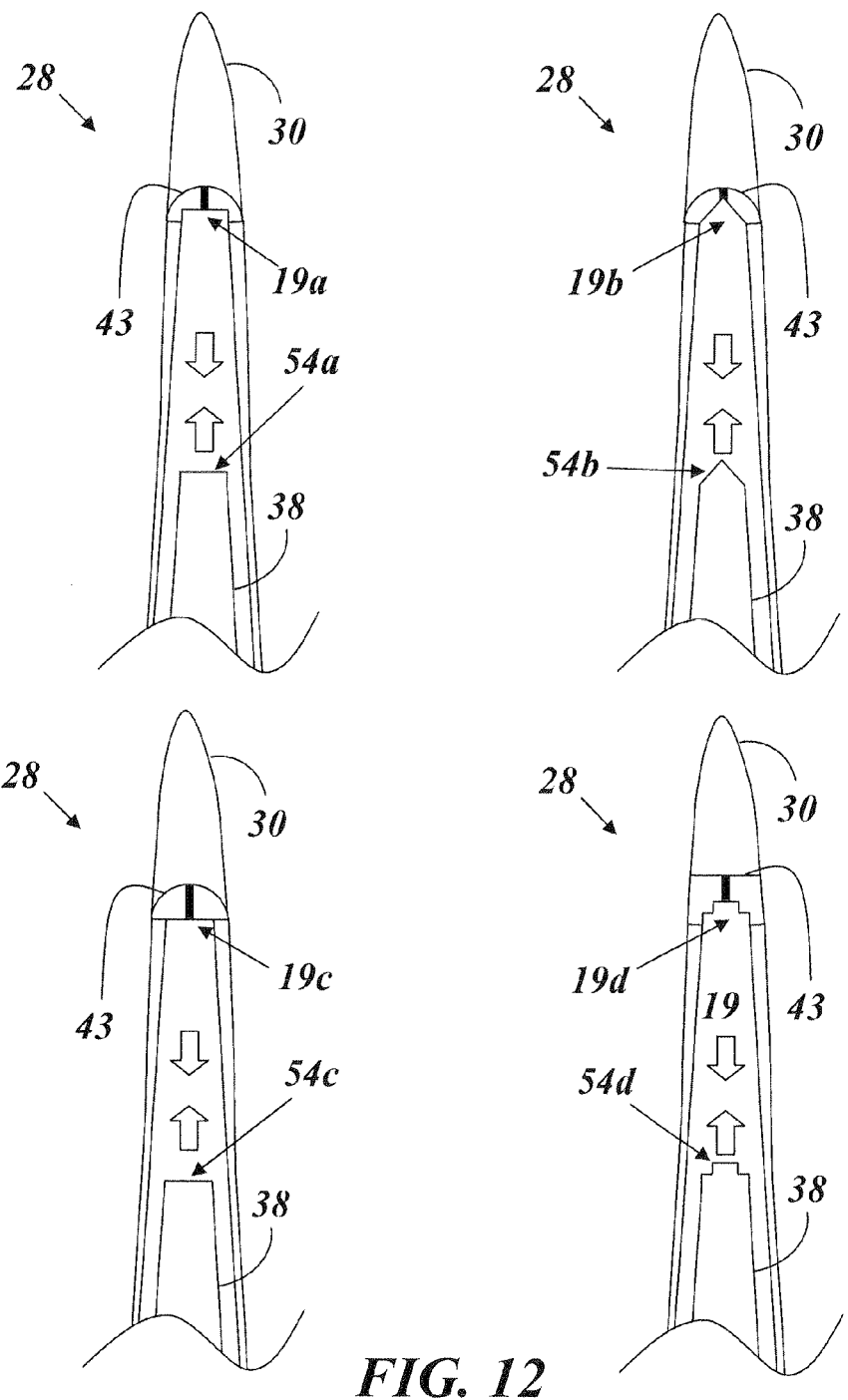
FIG. 12 is a cross-sectional view of alternative examples of other shapes of inner surfaces of leading edge base structures and outer surfaces of airfoil bodies, according to embodiments of the present invention.

Although embodiments of the present invention have been described with reference to a curved edge portion 20, it should be understood that other shapes and constructions are possible. For instance, FIG. 12 depicts a plurality of other possible forms that the inner surface 19a-d of the leading edge base structure 16 and the outer surface 54a-d of the airfoil body 38 can assume. As non-limiting examples, the leading edge base structure 16 can include a generally rectangular-shaped inner surface 19a, a generally triangular-shaped inner surface 19b, a generally flat inner surface 10c, or a generally step-shaped inner surface 19d. In a similar manner, the airfoil body 38 can include a generally rectangular-shaped outer surface 54a, a generally triangular-shaped outer surface 54b, a generally flat outer surface 54c, or a generally step-shaped inner outer surface 54d. Still other shapes are possible, as will be appreciated by one of skill in the art upon reading the present specification. Furthermore, the outer surface 43 of the curved edge portion 20 of the leading edge base structure 16 need not be circular or arc-shaped, as depicted in the example embodiments of FIGS. 1 through 12. Rather, the outer surface 43 can have a shape that is substantially the same as the inner surface 19a-d. Alternatively, the outer surface 43 of the portion 20 or can have a shape that is different from the shape of the inner surface 19a-d.

Furthermore, although the shapes of the inner surface 19 and the outer surface 54 are depicted as being perfectly complimentary (e.g., as in the inner surfaces 19a-d and the corresponding outer surfaces 54a-d of FIG. 12), it should be understood that in alternative embodiments, the inner surface 19 of the leading edge base structure 16 and the outer surface 54 of the airfoil body 38 are not complimentary. In such embodiments, empty spaces created by adjoining the leading edge base structure 16 and the airfoil body 38 can be filled, e.g., by adhesives, etc.

For purposes of illustration, the example embodiments described herein with reference to FIGS. 1 through 12 are implemented for aircraft engines and aircraft engine fan blades. Accordingly, in such example embodiments, the airfoil device 50 can be constructed of any suitable material, as would be appreciated by those of skill in the art. In illustrative embodiments, the airfoil bodies 38 are constructed from light-weight composite materials, such as aluminum, carbon fiber, stainless steel, Inconell (a nickel-based alloy), titanium, and other materials/composites. Similarly, the leading edge component 28 can be constructed of any suitable (e.g., hard) material, as would be understood by one of skill in the art upon reading the present specification. In illustrative embodiments, the leading edge component 28 is constructed from metals. For instance, the leading edge component 28 can be made from titanium 6-4 alloy AMS 4911, Inconell 718, aluminum, stainless steel, a nickel-based or cobalt-based supper alloy, other forms of titanium-based metal, bimetals, metal impregnated composites, and yet other materials that will be appreciated by those of skill in the art. The material deposit can be constructed from the same or from different materials (e.g., alloys, etc.) as the elongate sheets 10a, 10b. In illustrative embodiments, the material deposits be the same alloy as the sheet metal but it would be the preferred approach especially for this new approach.

The leading edge component 28 further can be included in any other suitable device generally utilizing airfoil devices or structures. Accordingly, the leading edge component 28 can be constructed from any other material(s) suitable for the particular intended application. As such, embodiments of the present invention are not limited to the specific applications, shape, materials, and the like, which are described herein for purposes of illustration.

Figure 13:
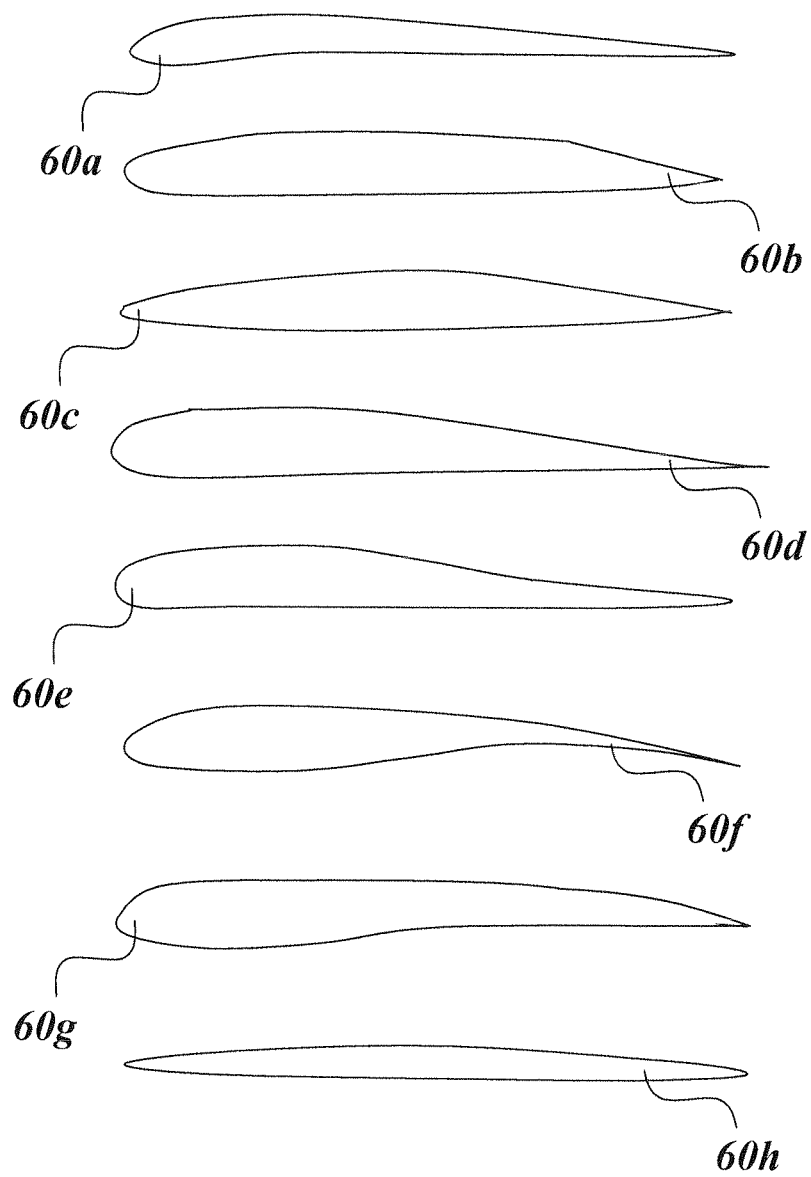
FIG. 13 is a diagrammatic illustration of a plurality of example airfoil shapes, according to aspects of the present invention.

For instance, many other airfoils and airfoil shapes are possible, including those depicted in FIG. 13 and generally known to those of skill in the art. In particular, FIG. 13 illustrates an airfoil 60a for generating laminar flow airfoil for a RC park flyer, an airfoil 60b for generating laminar flow airfoil for a RC pylon racer, an airfoil 60c for generating laminar flow for a manned propeller aircraft, a jet airliner airfoil 60d, a stable airfoil 60e used for flying wings, an aft loaded airfoil 60f allowing for a large main spar and late stall, a transonic supercritical airfoil 60g, and a supersonic leading edge airfoil 60h, or the like, including blades, vanes, wings, rudders, control surfaces, and other known airfoil configurations, generally. Accordingly, depending on the particular intended application and usage, the leading edge component 28 can substantially conform to these or any other airfoil shapes, as would be appreciated by those of skill in the art.

Embodiments of the present invention provide numerous benefits and advantages over the art. For example, by providing two separate elongate sheets 10a, 10b from which the leading edge component 28 is made, the leading edge component 28 can be manufactured with greater ease and at lower cost. Furthermore, providing the leading edge component 28 with an inner surface 19 forming an arc shape that extends along the entire length 62 of the leading edge component 28 enables the leading edge component 28 to be more easily manufactured. The arc shape on the inner surface 19 further allows the airfoil body 38 to similarly include an edge 52 that is more easily manufactured to have a uniform shape.

In addition, the curved edge portion 20 can provide increased structural integrity and strength to the leading edge component 28, e.g., particularly in embodiments where the curved edge portion 20 is shaped as an elongate (e.g., arc-shaped) bend, given that circular pieces typically possess fewer points of weakness and thus may be less prone to failure or wear during use. Furthermore, in utilizing a process whereby material (e.g., strong metallic material) is deposited in an additive manufacturing manner, a near net shape can be created, which can eliminate or greatly reduce the need for machining, thereby lowering overall manufacturing costs and times.

Finally, as will appreciated by one of skill in the art, the "buy-to-fly" ratio (e.g., for example embodiments implemented as wing blades) is a ratio of the amount of raw material to a final amount of material included in the resulting design. Accordingly, this ratio measures the efficiency in using purchased material to produce the resultant product (e.g., wing blade). In general, conventional titanium blades require about 10 lbs of titanium in order to produce a 2 lb part. Some illustrative embodiments of the present invention achieve a buy-to-fly ratio of only 3:2 lbs of material. Said differently, only 3 lbs of material is required to produce a 2 lb airfoil device 50, according to certain embodiments of the present invention. This represents significant reduction in material waste resulting from production, as well as raw material costs.

Numerous modifications and alternative embodiments of the present invention will be apparent to those skilled in the art in view of the foregoing description. Accordingly, this description is to be construed as illustrative only and is for the purpose of teaching those of skill in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method of making a leading edge component for an airfoil device having a shape substantially conforming to an airfoil, the method comprising:
   providing a first elongate sheet having a shape conforming to a surface on one of a suction side or a pressure side of the airfoil and comprising an elongate edge;
   providing a second elongate sheet having a shape conforming to a surface on the other of the suction side or the pressure side of the airfoil and comprising an elongate edge;
   welding together the first elongate sheet and the second elongate sheet at least along their respective elongate edges in such a way as to form a leading edge base structure comprising a weld and a convex outer surface, the weld extending along a length of the convex outer surface; and
   applying a plurality of material deposits onto an outer surface of the leading edge base structure in such a way as to cover the weld and form the leading edge component.

2. The method of claim 1, wherein any width-height cross-section along the length of the leading edge base structure includes a surface portion forming an arc having a substantially uniform radius of curvature.

3. The method of claim 2, further wherein, for any width-height cross-section along the length of the leading edge base structure, the weld is positioned along a center portion of the arc.

4. The method of claim 2, further wherein, for any width-height cross-section along the length of the leading edge base structure, the weld is positioned along a center portion or an off-center portion of the arc.

5. The method of claim 1, wherein any width-height cross-section along the length of the leading edge base structure includes a generally rectangular-shaped surface, a generally triangular-shaped surface, a generally flat surface, or a generally step-shaped surface.

6. The method of claim 1, further wherein the shape of the first elongate sheet substantially conforms to a first portion of a leading edge of the airfoil and the shape of the second elongate sheet substantially conforms to a second portion of the leading edge of the airfoil.

7. The method of claim 1, wherein the first elongate sheet and the second elongate sheet each concludes with a substantially flat face, and further wherein the first elongate sheet and the second elongate sheet are welded together along their respective substantially flat faces.

8. The method of claim 1, further wherein the formed leading edge component comprises a near net shape.

9. The method of claim 1, further comprising at least partially machining the leading edge component.

10. The method of claim 1, further comprising coupling the leading edge component to an airfoil body to form the airfoil device.

11. The method of claim 10, wherein the airfoil device is an aircraft engine fan blade.

12. The method of claim 10, wherein the airfoil body is formed of a substantially non-metal based material.

13. The method of claim 10, wherein the leading edge component is formed of a substantially metal based material and the airfoil body is formed of a substantially non-metal based material.

14. The method of claim 10, wherein the leading edge component is formed of one or more first materials and the airfoil body is formed one or more second materials, wherein the one or more first materials are partially or entirely different from the one or more second materials.

15. The method of claim 1, wherein the plurality of material deposits are provided onto the convex outer surface of the leading edge base structure using an additive manufacturing technique.

16. The method of claim 1, wherein the additive manufacturing technique comprises laser cladding.

17. The method of claim 1, wherein the step of welding together the first elongate sheet and the second elongate sheet comprises laser welding.

18. The method of claim 1, further comprising forming a plurality of leading edge components, and including the plurality of leading edge components in an aircraft engine.

19. The method of claim 1, wherein the leading edge component is formed of a substantially metal based material.

20. The method of claim 1, wherein the plurality of material deposits are metallic.

21. A device, comprising:
   a plurality of airfoil devices each having a shape substantially conforming to an airfoil, each of the plurality of airfoil devices comprising an airfoil body and a leading edge component situated on the airfoil body;
   wherein, for each of the plurality of airfoil devices, the leading edge component comprises:
      a leading edge base structure comprising a first elongate sheet, a second elongate sheet, and a weld coupling the first elongate sheet to the second elongate sheet, the weld extending across substantially all of a length of the leading edge base structure; and
      a plurality of material deposits disposed on an outer surface of the leading edge base structure and extending along the length thereof, wherein the plurality of material deposits are applied directly onto the outer surface of the leading edge base structure in such a way as to cover the weld and form the leading edge component;
   wherein the first elongate sheet has a shape substantially conforming to a surface on one of a suction side or a pressure side of the airfoil and the second elongate sheet has a shape conforming to a surface on the other of the suction side or the pressure side of the airfoil.

22. The device of claim 21, wherein each of the plurality of airfoil devices is a fan blade.

23. The device of claim 21, wherein the device is an aircraft engine or a turbine engine.

24. The device of claim 21, wherein the first and second elongate sheets are formed of a metal or metal based material.

25. The device of claim 21, wherein each leading edge component is formed of a substantially metal based material.

26. The device of claim 21, wherein, for each of the plurality of airfoil devices, the airfoil body is formed of a substantially non-metal based material.

27. The device of claim 21, further wherein, for each of the plurality of airfoil devices, the leading edge component is formed of a substantially metal based material and the airfoil body is formed of a substantially non-metal based material.

28. The device of claim 21, wherein, for each of the plurality of airfoil devices, the leading edge component is formed of one or more first materials and the airfoil body is formed one or more second materials, wherein the one or more first materials are partially or entirely different from the one or more second materials.

29. The device of claim 21, wherein the plurality of material deposits comprises metallic material.

30. A method of making a leading edge component for being situated on an airfoil body, the method comprising:

providing a first elongate metallic sheet having a shape conforming to a surface on one of a suction side or a pressure side of the airfoil body and comprising an elongate edge;

providing a second elongate metallic sheet having a shape conforming to a surface on the other of the suction side or the pressure side of the airfoil body and comprising an elongate edge;

welding together the first elongate metallic sheet and the second elongate metallic sheet at least along their respective elongate edges in such a way as to form a leading edge base structure comprising a weld and a convex outer surface, the weld extending along a length of the convex outer surface; and applying a plurality of metallic layers directly onto an outer surface of the leading edge base structure in such a way as to cover the weld, whereby the leading edge component.

* * * * *

UNITED STATES PATENT AND TRADEMARK OFFICE
CERTIFICATE OF CORRECTION

PATENT NO. : 9,279,328 B2
APPLICATION NO. : 13/280742
DATED : March 8, 2016
INVENTOR(S) : Roy et al.

Page 1 of 1

It is certified that error appears in the above-identified patent and that said Letters Patent is hereby corrected as shown below:

In the Claims:

Column 16, claim 21, lines 37-38, the phrase "shape substantially conforming" should read "shape conforming".

Column 16, claim 21, line 46, the phrase "across substantially all of a length" should read "across a length".

Column 16, claim 21, line 55, the phrase "shape substantially conforming" should read "shape conforming".

Column 18, claim 30, line 16, the phrase "the weld, whereby the leading" should read "the weld and form the leading".

Signed and Sealed this
Fourteenth Day of June, 2016

Michelle K. Lee
*Director of the United States Patent and Trademark Office*